United States Patent Office 2,888,480
Patented May 26, 1959

2,888,480
PREPARATION OF THIOLACRYLIC ESTERS

Harry T. Neher, Bristol, and Edward H. Specht, Huntingdon Valley, Pa., and Everett J. Kelley, Pennsauken, N.J., assignors to Rohm & Haas Company, Philadelphia, Pa., a corporation of Delaware No Drawing. Application October 2, 1957
Serial No. 687,611

9 Claims. (Cl. 260—455)

This invention deals with a method for preparing thiolacrylic esters, especially alkyl thiolacrylates. With greater particularity this invention concerns preparing thiolacrylates by first reacting acrylic acid, nickel carbonyl, and acetylene, then bringing into this reacting mixture carbon monoxide and a thiol, and in this reacting mixture reacting together acrylic acid, nickel carbonyl, carbon monoxide, acetylene, and a thiol. From the reaction mixture is separated a thiolacrylic ester.

In reports on the stoichiometric reaction of alcohol, acetylene, nickel carbonyl, and acids to form alkyl acrylates it was suggested that compounds other than alcohols having reactive hydrogen might be useful in this reaction to give for example thiolacrylic esters. In a reported preparation, however, the actual yield of thiolacrylate was poor. Repetition of such preparations showed the principal product was not thiolacrylate $CH_2=CHCOSR$, but a thio thiolpropionate of the structure $RSCH_2CH_2COSR$. The same product was obtained when the procedure described in United States Patent 2,582,911 was followed with the starting alcohol replaced with a thiol.

In a careful study of the reaction of thiols, nickel carbonyl, hydrochloric acid, and acetylene, this study following the teachings of this patent, there was placed in a reaction vessel 900 parts of benzene and a solution of nickel carbonyl in benzene was slowly pumped in along with acetylene and hydrogen chloride gas both at metered rates. Methyl mercaptan was then also admitted. The rates of flow were 52 parts per hour of nickel carbonyl, 27.3 parts of acetylene, 52 parts of benzene, 18.3 parts of hydrogen chloride, and 96 parts of methanethiol per hour. In thirty minutes the temperature rose to 35° C. and color developed. Reaction was thus continued for four hours, at which time the reaction mixture was flushed with acetylene and methanethiol, washed with water, dried over anhydrous potassium carbonate, and fractionally distilled. After removal of solvent two main fractions were taken at 40° C./35 mm. to 58° C./12 mm., and 58° C./12 mm. to 75° C./2 mm. The cuts boiling above 40° C./35 mm. were redistilled to give about a 6% yield of methylthiolacrylate and about a 35% yield of the methyl methylthiothiolpropionate.

When reaction was started with methyl mercaptan, acetylene, nickel carbonyl, and hydrogen chloride, and then carbon monoxide was introduced, reaction continued for only a short time, the reaction system proving to be very unstable even with low proportions of carbon monoxide. Since relatively high proportions of carbon monoxide are desirable, it was clear that the mere substitution of a thiol in the particular process of the above-mentioned patent did not lead to a practicable procedure.

It was then unexpectedly discovered that a stable reaction with favorable utilization of carbon monoxide is obtained when a reaction is started with acrylic acid, nickel carbonyl, and acetylene in an inert organic solvent between 25° C. and 75° C. and to this reacting mixture carbon monoxide and a mercaptan are supplied and reacted between 25° C. and 75° C. or 80° C. Reaction can then be maintained indefinitely by continuing to bring together in the reacting mixture acrylic acid, nickel carbonyl, carbon monoxide, acetylene, and a thiol. Materials are, of course, supplied in approximately the proportions needed to give the desired thiolacrylate with the ratio of carbon monoxide to nickel carbonyl being less than seventy mole percent of the total CO or total available carbonyl, and preferably not exceeding 65%. The lower ratio for carbon monoxide is not exact, being merely one for economic consideration, which indicate that carbon monoxide should supply commonly at least 20% of the total CO requirements and preferably at least 25%.

The acid supplied should be approximately equivalent to the nickel of the nickel carbonyl to form a nickelous salt. The acid may be, however, equivalent to only 80% of the nickel carbonyl or may be used in an excess of 10% to 20%. Yet the process is operative with even larger deviations from equivalency, but usually without particular advantage.

Acetylene is preferably supplied in equivalency up to a small excess over the total available carbonyl. Thus from an equivalence of acetylene up to 10% excess is preferred, but acetylene may be supplied in an excess up to about 25% or on the other hand acetylene may be used in a deficiency of 10% or even 20% without altering the reaction or, stated in a different way, acetylene is supplied at 0.8 to 1.25 moles per mole of total available carbonyl.

The mercaptan or thiol should be supplied in an amount about equivalent to the total CO or total carbonyl available, but the actual proportion used may deviate from this by a considerable amount, whether deficiency or excess, without upsetting the reaction. It is preferred to supply the mercaptan (within 10% of equivalency) best at 100% to 110% of equivalency based on total available carbonyl, but product has been obtained with 100% excess down to 75% deficiency.

The reactions are best performed in the presence of an inert organic solvent. Examples of useful solvents are benzene, toluene, acetone, methyl ethyl ketone, diethyl ketone, dioxane, and ethyl acetate, and mixtures of such solvents. The proportion of solvent may be desirably from about 20% to about 60% of the total reaction mixture. It is usually desirable to have solvent present from the first stage of the reactions and to continue to add solvent as reaction progresses so as to maintain the reaction medium in a fluid state.

The temperature of the reaction mixture may be varied from about 20° C. to about 80° C. The reactions may be started at room temperature with the heat of reaction increasing the temperature, which may then be maintained at a desired level by rate of addition of reactants and/or cooling. A range of 35° C. to 65° C. is usually preferred for reacting the five substances, acrylic acid, nickel carbonyl, acetylene, carbon monoxide, and thiol.

One of the advantages of the process of this invention is that it may be effected at about normal to moderate temperatures and normal pressures. In any case, success of the process does not depend upon elevated pressures. If reactants are supplied under pressure, the reactions may proceed with a need to dispose of the heat evolved from increased reaction in a given apparatus.

As useful thiols there may be used any of the alkanethiols, such as methanethiol, ethanethiol, butanethiol, octane thiol, dodecanethiol, tetradecanethiol, octadecanethiol, or the like. The alkyl group may be primary, secondary, or tertiary. Other thiols are also effective in the process, such as cyclohexanethiol or aralkyl mercaptans, and also substituted thiols such as mercaptoethanol, methoxyethanethiol, butoxyethanethiol, or ethoxyethoxyethanethiol. It is generally desirable to use distilled thiol to avoid impurities. Hydrogen sulfide, for example, was found in some thiols and it was observed to interfere with smooth operation.

It is not essential that the acrylic acid be glacial, as water does not interfere and in the presence of the acrylic acid will react to form additional acrylic acid.

Acrylic acid is the preferred acid for starting the reaction, although it is possible to initiate the course of the reactions with other low molecular carboxylic acid, such as acetic or propionic. If the preparation is to be carried on over a considerable period of time the presence of a thiolacetate or thiolpropionate in the first product may not be serious and in due course pure thiolacrylate is obtained. It is preferred to start with acrylic acid and of course, to continue with it.

For the practical operation of the process of this invention it is best to displace air from the reaction vessel with an inert gas, such as nitrogen, and charge this vessel with inert organic solvent. Acrylic acid is run in along with nickel carbonyl, which is conveniently added as a solution in an inert organic solvent. The flow of acetylene is started. Reaction often begins spontaneously. If it does not, the reaction mixture may be warmed or heated. When reaction is evident from rise of temperature, absorption of gas, and development of color, the rate of addition of reactants may be adjusted to ensure good reaction. Then the addition of thiol is begun. Methanethiol or ethanethiol may be supplied as gas or vapor or as liquid. Other thiols may be added as liquids or as solution in inert, organic solvent.

Either before or after addition of the thiol, but in any case after the initial reaction of acid, nickel carbonyl, and acetylene has been established, the flow of carbon monoxide is begun. There is thus brought about the reaction of acrylic acid, nickel carbonyl, carbon monoxide, acetylene, and thiol and this reaction can be carried on continuously.

As the reaction proceeds, reaction mixture can be taken off, as by overflow. This effluent, if it contains free nickel carbonyl, is desirably treated to removed this substance. This is readily accomplished by reacting the nickel carbonyl with acid, thiol, and acetylene. Often free acid is already present as also thiol and only acetylene need be run into the effluent. If, however, one or more is absent, the lacking material is added in about the requisite amount and acetylene is run in.

The reaction mixture is now worked up to isolate the desired thiolacrylate. The nickel salt is first separated. It has been found best to separate nickel as the chloride. This is accomplished by washing the reaction mixture with dilute hydrochloric acid. The particular concentration of this acid is not important. Conveniently used is a solution prepared by diluting commercial hydrochloric acid with ont to three volumes of water. The organic layer is then washed with water and a dilute alkaline solution to remove acid and is desirably dried, as over potassium carbonate. The dried liquid is now fractionally distilled best in the presence of a polymerization inhibitor.

Examples follow which are illustrative of the process of this invention, but are not limiting. Parts are by weight unless otherwise noted.

*Example 1*

An apparatus was constructed with a vertical tube with jacket through which warm or cold water could be passed to control temperature, a pump for introducing material to the tube, and a surge vessel for receiving reaction mixture from the tube.

At the start the apparatus was flushed with nitrogen and the tube was charged with 560 parts of methyl ethyl ketone and 100 parts of acrylic acid. Feeds were then started of acetylene at 28.6 parts per hour, nickel carbonyl in methyl ethyl ketone at 43 parts of $Ni(CO)_4$ per hour in 54 parts of methyl ethyl ketone. The initial temperature was 26° C. Within twenty minutes temperature was noted to rise to about 42° C. and was maintained thereafter at 38° C. to 42° C. with cooling. At thirty minutes from the start a feed of acrylic acid in methyl ethyl ketone was started at 43 parts of acid per hour with 126 parts of the ketone. Then a flow of methanethiol as a gas was started at the rate of 53 parts per hour. Reaction continued. After forty-five minutes from the start acetylene was supplied at a rate of 40.8 parts per hour and carbon monoxide was introduced at the rate of 12 parts per hour. The feed of methanethiol was raised to 76 parts per hour. Reaction continued with other feeds as before. At the end of sixty minutes from the start feed rates were adjusted to give 48 parts of acetylene, 19 parts of carbon monoxide, and 89 parts of mercaptan, all parts per hour. Rates were increased at fifteen minute intervals until after one-hundred and five minutes (total time) the feed rates were—acetylene 72 parts, carbon monoxide 42 parts, methanethiol 132 parts, nickel carbonyl 43 parts, acrylic acid 43 parts, and solvent 180 parts. Effluent was taken off via the surge vessel and treated with acetylene, there being present free acid, free thiol and nickel carbonyl. In this way the nickel carbonyl was entirely used up.

After five hours the total effluent was collected and washed with a 19% solution of hydrochloric acid. The organic layer was taken and washed with about half of its volume of water, to which potassium carbonate was added until neutrality was reached. The organic layer was separated and dried over potassium carbonate. The dried liquid now totaled 2121 parts by weight.

The dried liquid was fractionally distilled after 10 parts of di-$\beta$-naphthol had been added. After removal of solvent there was obtained at 50° C./60 mm. to 85° C./2 mm. 711 parts of distillate containing by analysis 93.5% of ester, identified as chiefly methyl thiolacrylate. A fraction of 18 parts was taken above 85° C./2 mm. which was chiefly methyl methylthiothiolpropionate. A residue of 60 parts was obtained. Additional amounts of methyl thiol acrylate were recovered from the initial fractions. The total recovery of methyl thiolacrylate corresponded to a yield of 74% based on total carbonyl supplied during the feeding of methanethiol.

*Example 2*

The above-described apparatus was charged with 560 parts of methyl ethyl ketone and 100 parts of acrylic acid. Feeds were started of acetylene at 29 parts per hour, and nickel carbonyl at 51 parts per hour in methyl ethyl ketone at 49 parts per hour. Reaction started within twenty-eight minutes with rise in temperature to 43° C. Temperature then dropped slightly and was thereafter maintained between 38° C. and 42° C. with cooling as needed. At the end of thirty minutes from the start acrylic acid was fed at 36 parts per hour in 131 parts of methyl ethyl ketone. Then methanethiol was introduced as a gas at 53 parts per hour. Reaction continued.

At forty-five minutes a flow of carbon monoxide was started at 12 parts per hour, this being subsequently increased in steps until at one hundred minutes the rate was 52 parts per hour. Meanwhile, flow of acetylene was increased to 82 parts per hour and the flow of methanethiol to 152 parts per hour with other feeds remaining as before.

Effluent was taken from the main reactor and treated with acrylic acid until this was at least equivalent to the nickel carbonyl content thereof and acetylene was supplied until this nickel carbonyl was consumed.

Effluent thus treated over a period of five hours was worked up essentially as described in Example 1. The main product was methyl thiolacrylate in a yield of 73% based on the total carbonyl supplied during the feeding of the mercaptan.

The above procedure was repeated with substitution of various solvents. With aromatic solvents it was found desirable to increase somewhat the proportion of solvent to maintain fluidity, while with acetone, dioxane, and ethyl acetate the above procedure was quite satisfactory.

When the temperature of reaction was maintained at about 30° C. or above 65° C., it was noted that there was a lower degree of stability for high utilizations of carbon monoxide.

The above general procedure may also be followed with change in the order of addition of thiol and carbon monoxide. Thus, after initial reaction and usually at twenty to forty minutes from the start carbon monoxide may be introduced, as at 12 to 20 parts per hour, followed by introduction of the thiol, with subsequent adjustment of feed rates to give a high utilization of carbon monoxide and a good rate of reaction.

The methyl thiolacrylate produced by any of the above procedures, when redistilled, has a boiling point of 53° C./55 mm. a refractive index $n_D^{20}$ of 1.4996, saponification number of 555 (calculated 549), and acid number of zero. By infra red analysis the methyl thiolacrylate prepared as above contains 1.7% of methyl thiolpropionate, which distills too close to methyl thiolacrylate to be removable by usual distillations.

Example 3

An apparatus similar to that described above was charged with 560 parts of methyl ethyl ketone and 80 parts of acrylic acid at 28° C. There were passed thereinto 43 parts per hour of nickel carbonyl in 102 parts of methyl ethyl ketone and 27 parts per hour of acetylene. In a short time reaction began with absorption of acetylene, development of color, and rise of temperature. After forty-five minutes ethanethiol was introduced at 68.5 parts per hour in a solution of 66 parts of methyl ethyl ketone. A flow of acrylic acid was started at 43 parts per hour. Reaction continued with the temperature holding at about 39° C.–40° C. At seventy-five minutes flow of carbon monoxide was started at 12 parts per hour this being increased in small steps until at one-hundred and twenty minutes the rate of flow was 42 parts per hour. Meanwhile rate of addition of acetylene was gradually increased to 68 parts per hour and rate of addition of ethanethiol to 171 parts per hour in 163 parts of methyl ethyl ketone. The temperature varied up to 45° C., at which level cooling was supplied.

The effluent was treated with acetylene to consume free nickel carbonyl. The reaction mixture was then worked up as above, with washing with acid, water, and dilute alkali, drying and distilling. The main fraction was collected at 55° C.–66° C./60 mm. It consisted of 91% ester, chiefly ethyl thiolacrylate. A higher boiling fraction (at 66° C./60 mm.) was chiefly ethyl ethylthiothiolpropionate in a ratio of less than one part per 20 parts of ethyl thiolacrylate. Additional ethyl thiolacrylate was recovered from the foreruns and washes and combined with the main fraction, which was then redistilled. The final product corresponds by analysis to ethyl thiolacrylate, having a boiling point of 59° C./40 mm., a refractive index, $n_D^{20}$, of 1.4886, a saponification number of 479 (theory 483), a sulfur content of 27.4% (theory 27.6%), and a zero acid number.

Example 4

The reactor was charged with 560 parts of methyl ethyl ketone and 80 parts of acrylic acid at 30° C. Nickel carbonyl was passed in at 43 parts per hour in 102 parts of methyl ethyl ketone. After thirty-two minutes reaction was observed with a rise of temperature to about 40° C. Propanethiol, n-C$_3$H$_7$SH, was added at 84 parts per hour and then acrylic acid at 43 parts per hour. After forty-five minutes from the start acetylene flow was adjusted to 39 parts per hour and carbon monoxide was introduced at 12 parts per hour. The flow of thiol was increased to 119 parts per hour. The temperature was then at 39° C. At the end of one-hundred and five minutes rates of flow were acetylene 68 parts, carbon monoxide 42 parts, and propanethiol 209 parts, all per hour, having been stepwise increased, while acrylic acid remained at 43 parts per hour, nickel carbonyl at 43 parts per hour, in 102 parts of solvent. Reaction was continued with removal of effluent, which was treated with acetylene and worked up in about the same way as in the previous examples.

A main fraction was taken at 65° C./25 mm., consisting of 100% ester by saponification number. The yield of n-propyl thiolacrylate was 73% based on total carbonyl supplied during addition of propanethiol.

A purified sample of propyl thiolacrylate had a boiling point of 54° C./15 mm., a refractive index, $n_D^{20}$ of 1.4852, a saponification number of 425 (theory 431), an acid number of zero, and a sulfur content of 24.3% (theory 24.6%).

Example 5

The above general procedure was followed with sec-butanethiol. The reaction was started in 560 parts of methyl ethyl ketone and 80 parts of acrylic acid with 43 parts per hour of nickel carbonyl being added in 102 parts of methyl ethyl ketone. Within thirty-six minutes reaction was taken place and temperature rose to 44° C. at which point, at 99 parts per hour, sec-butanethiol was supplied. At forty-five minutes flow of acetylene was increased to 39 parts per hour and carbon monoxide was added at 12 parts per hour. Flow of thiol was increased to 142 parts per hour, the temperature then being kept at 43° C. with some heat being supplied. At ninety minutes from the start the acetylene feed had been carried to 61 parts per hour, the carbon monoxide feed to 34 parts per hour, and the thiol feed to 220 parts per hour, while acid solvent and nickel carbonyl feeds remained as before. Effluent was treated with acetylene and worked up in the same manner as above.

A main fraction was taken at 55° C./30 mm. to 90° C./8 mm., consisting of 97.5% ester. From the foreruns and washings some additional sec-butyl thiolacrylate was recovered. The total yield of sec-butyl thiolacrylate was 68.5%.

The purified product boiled at 56° C./10 mm. and had a refractive index at 20° C. of 1.4823, a saponification number of 380 (theory 389), and an acid number of zero. It contained 21.5% of sulfur (theory 22.2%).

Cyclohexanethiol behaves much like sec-butanethiol and gives cyclohexyl thiolacrylate.

Example 6

The above procedure was followed with tert-butanethiol, proportions of materials being the same except that the final rates of addition were, after seventy-five minutes from the start, 43 parts per hour of nickel carbonyl in 102 parts of methyl ethyl ketone, 43 parts per hour of acrylic acid, 55 parts of acetylene, 28 parts of carbon monoxide, and 198 parts of tert-butanethiol. The temperature during the reaction was kept between 44° C. and 50° C. The effluent was treated with acetylene and worked up as in previous examples. The main fraction was taken at 62° C./25 mm. to 60° C./8 mm. and was 96.5% ester. After recovery of product from the foreruns and redistillation there was obtained tert-butyl thiolacrylate in a 72% yield based on total carbonyl supplied during addition of the thiol.

Example 7

There was used a lauryl mercaptan having an average molecular weight of 211 and distilling at 100° C.–190° C., containing normal alkyl groups from about C$_8$ to C$_{16}$. This thiol was reacted in much the same way as in previous examples, proportions being similar and the reaction temperatures being 38° C.–45° C. Final rates of feeds, the initial charge being 560 parts of methyl ethyl ketone and 80 parts of acrylic acid, were nickel carbonyl 43 parts per hour in 102 parts of methyl ethyl ketone, acrylic acid 43 parts per hour, acetylene 55 parts per hour, carbon monoxide 28 parts, and lauryl mercaptan 465 parts. The effluent was worked up as above. The main cut was taken at 120° C./1 mm. to 170° C./5 mm. This distillate contained 78.2% of ester, the balance being largely unreacted mercaptan.

A portion of this was purified. The purified sample distilled at 130° C./4 mm. to 145° C./1 mm. It has a saponification number of 209 (calculated 212), a refractive index, $n_D^{20}$, of 1.4761, and a sulfur content of 11.6% (theory 12.1%). The yield of lauryl thiolacrylate was 60% based on total carbonyl.

Example 8

The procedure of the previous example was followed by a tert-dodecanethiol having an average molecular weight of 200. Reaction was carried out at 38° C.–45° C. with final rates of 43 parts of nickel carbonyl in 102 parts of methyl ethyl ketone, 43 parts of acrylic acid, 46 parts of acetylene, 19 parts of carbon monoxide, and 368 parts of tert-dodecanethiol. The reaction mixture was worked up as in previous examples the main cut being taken at 95° C./3 mm. to 185° C./8 mm. This cut was 73% ester, the balance being chiefly unreacted thiol. The yield was 52% based on total carbonyl of tert-dodecyl thiolacrylate.

In the same way there may be used other alkanethiols with similar results. For example, the method of this invention can be advantageously applied to n-octanethiol, tert-tetradecanethiol, tert-heptanethiol, isobutanethiol, n-hexanethiol, n-tetradecanethiol, n-hexadecanethiol, tert-hexadecanethiol, n-octadecanethiol, and the like. Similarly, there may be used 2-phenylethanethiol or 2- or 3-phenylpropanethiol or other arylalkanethiols. In general any alkanethiol or hydrocarbon-substituted alkanethiol is amenable to the process of this invention to yield the corresponding alkyl thiolacrylate.

In place of an alkanethiol or a hydrocarbon-substituted alkanethiol there may be used a thiol having a hydroxy or ether substituent.

Example 9

There was charged to the reaction vessel 560 parts of methyl ethyl ketone and 80 parts of acrylic acid. To this charge was added nickel carbonyl at 43 parts per hour in 102 parts of methyl ethyl ketone, and acetylene at 27 parts per hour. Reaction took place within 34 minutes with the temperature going to 32° C. The reaction mixture was heated to 43° C. There was introduced hydroxyethanethiol at 43 parts per hour and acrylic acid also at 43 parts per hour. After forty-five minutes from the start carbon monoxide was run in at 12 parts per hour. Flow of acetylene was increased to 39 parts per hour and hydroxyethanethiol to 61 parts. After seventy-five minutes rates of flow were stepwise brought to 55 parts per hour of acetylene, 28 parts of carbon monoxide, and hydroxyethanethiol to 86 parts. Effluent was treated with acetylene and worked up as above. A main cut was taken at 55° C./4 mm. to 120° C./4 mm. This cut was found to contain 28% of $$CH_2=CHCOOC_2H_4SOCCH=CH_2$$

Redistillation of the main cut twice gave fairly pure diester, boiling at 72° C./3 mm. to 80° C./3 mm. having a saponification number of 559 and an acid number of 3. The purity is thus 92%. The refractive index, $n_D^{20}$, is 1.4967.

When the hydroxyl group of hydroxyethanethiol is blocked as with an alkyl group, R, the product is the ester $ROCH_2CH_2SOCCH=CH_2$.

The thiolacrylates are relatively reactive substances and should be stored with adequate precautions, including storage at reduced temperatures and/or addition of a polymerization inhibitor.

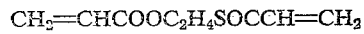

The thiolacrylates, as is known, polymerize readily under the influence of a free radical initiator. They form homopolymers and copolymers. Small proportions of a thiolacrylate in admixture with a polymerizable monovinylidene compound impart an improved thermal stability to the copolymers formed from mixtures.

The process of this invention provides a way of preparing thiolacrylic esters in good purity and in good yields. It avoids the large proportion of addition product which results in previously proposed procedures and which forms by the combination of a thiol and a thiolacrylate. Contrary to reports in the literature the thiolacrylates, at least as prepared by the process of this invention, do not exhibit the unpleasant, repelling odors associated with many sulfur derivatives. In fact some of the thiolacrylates possess a pleasant aroma.

We claim:

1. A process for preparing thiolacrylic esters which comprises reacting together between 25° C. and 75° C. in an inert organic solvent acrylic acid, nickel carbonyl, and acetylene and, while said substances are reacting together in the reaction mixture, bringing into the reacting mixture and there reacting between 20° C. and 80° C. a thiol and carbon monoxide, the carbon monoxide being added in a proportion supplying less than 70% of the total carbonyl groups from said monoxide and available from said nickel carbonyl.

2. A process for preparing alkyl thiolacrylates which comprises reacting together between 25° C. and 75° C. in an inert organic solvent acrylic acid, nickel carbonyl, and acetylene and, while these substances are reacting together in the reaction mixture, bringing into the reacting mixture and there reacting between 25° C. and 80° C. an alkanethiol and carbon monoxide, the carbon monoxide being added in a proportion supplying less than 70% from said monoxide and available from said nickel carbonyl.

3. A process for preparing alkyl thiolacrylates which comprises reacting together between 25° C. and 75° C. in an inert organic solvent acrylic acid, nickel carbonyl, and acetylene and, while these substances are reacting together bringing into the reacting mixture and there reacting between 25° C. and 80° C. an alkanethiol and carbon monoxide and continuing the reaction by bringing together into the reaction mixture acrylic acid, nickel carbonyl, acetylene, carbon monoxide, and an alkanethiol, the carbon monoxide being supplied in a proportion providing between 20% and 65% of the total carbonyl from said monoxide and available from the nickel carbonyl, the acetylene being supplied in a proportion from 0.8 to 1.25 moles per mole of total available carbonyl, the said acid being supplied in a proportion equivalent within 20% to the nickel carbonyl, and the alkanethiol being supplied within an equivalency of 10% referred to the total available carbonyl.

4. A process for preparing alkyl thiolacrylates which comprises reacting together between 25° C. and 75° C. in an inert organic solvent acrylic acid, nickel carbonyl, and acetylene and, while these substances are reacting between 25° C. and 75° C., bringing into this reacting mixture and reacting therein carbon monoxide and an alkanethiol and continuing the reaction between 35° C. and 65° C. by bringing together into the reacting mixture acrylic acid, nickel carbonyl, acetylene, carbon monoxide, and an alkanethiol, the carbon monoxide being supplied in a proportion providing between 25% and 65% of the total carbonyl from said monoxide and available from the nickel carbonyl, the acetylene being supplied in a proportion from 80% to 125% equivalency based on total available carbonyl, the said acid being supplied within an equivalency of 20% based on nickel carbonyl and the alkanethiol being supplied within an equivalency of 101% to 110% based on the total available carbonyl.

5. A process for preparing methyl thiolacrylate which comprises reacting between 25° C. and 75° C. in an inert organic solvent acrylic acid, nickel carbonyl, and acetylene and, while these substances are reacting, bringing into this reacting mixture and reacting therein carbon monoxide and methanethiol and continuing the reaction between 35° C. and 65° C. by bringing together into the reacting mixture acrylic acid, nickel carbonyl, acetylene, carbon monoxide, and methanethiol, the carbon monoxide being supplied in a proportion providing between 25% and 65% of the total carbonyl from said monoxide and available from the nickel carbonyl, the acetylene being supplied in an excess of 1% to 10% based on total available carbonyl, the said acid being supplied within 20% of equivalency based on the nickel carbonyl, and the methanethiol being supplied between equivalency and 10% excess based on total available carbonyl.

6. A process for preparing ethyl thiolacrylate which comprises reacting between 25° C. and 75° C. in an inert organic solvent acrylic acid, nickel carbonyl, and acetylene and, while these substances are reacting, bringing into this reacting mixture and reacting therein carbon monoxide and ethanethiol and continuing the reaction between 35° C. and 65° C. by bringing together into the reacting mixture acrylic acid, nickel carbonyl, acetylene, carbon monoxide, and ethanethiol, the carbon monoxide being supplied in a proportion providing between 25% and 65% of the total carbonyl from said monoxide and available from the nickel carbonyl, the acetylene being supplied in an excess of 1% to 10% based on total available carbonyl, the said acid being supplied within 20% of equivalency based on the nickel carbonyl, and the ethanethiol being supplied between equivalency and 10% excess based on total available carbonyl.

7. A process for preparing butyl thiolacrylate which comprises reacting between 25° C. and 75° C. in an inert organic solvent acrylic acid, nickel carbonyl, and acetylene and, while these substances are reacting, bringing into this reacting mixture and reacting therein carbon monoxide and butanethiol and continuing the reaction between 35° C. and 65° C. by bringing together into the reacting mixture acrylic acid, nickel carbonyl, acetylene, carbon monoxide, and butanethiol, the carbon monoxide being supplied in a proportion providing between 25% and 65% of the total carbonyl from said monoxide and available from the nickel carbonyl, the acetylene being supplied in an excess of 1% to 10% based on total available carbonyl, the said acid being supplied within 20% of equivalency based on the nickel carbonyl, and the butanethiol being supplied between equivalency and 10% excess based on total available carbonyl.

8. A process for preparing n-dodecyl thiolacrylate which comprises reacting between 25° C. and 75° C. in an inert organic solvent acrylic acid, nickel carbonyl, and acetylene and, while these substances are reacting, bringing into this reacting mixture and reacting therein carbon monoxide and n-dodecanethiol and continuing the reaction between 35° C. and 65° C. by bringing together into the reacting mixture acrylic acid, nickel carbonyl, acetylene, carbon monoxide, and n-dodecanethiol, the carbon monoxide being supplied in a proportion providing between 25% and 65% of the total carbonyl from said monoxide and available from the nickel carbonyl, the acetylene excess of 1% to 10% based on total available carbonyl, the said acid being supplied within 20% of equivalency based on the nickel carbonyl and the n-dodecanethiol being supplied between equivalency and 10% excess based on total available carbonyl.

9. A process for preparing tert-dodecyl thiolacrylate which comprises reacting between 25° C. and 75° C. in an inert organic solvent acrylic acid, nickel carbonyl, and acetylene and, while these substances are reacting, bringing into this reacting mixture and reacting therein carbon monoxide and tert-dodecanethiol and continuing the reaction between 35° C. and 65° C. by bringing together into the reacting mixture acrylic acid, nickel carbonyl, acetylene, carbon monoxide, and tert-dodecanethiol, the carbon monoxide being supplied in a proportion providing between 25% and 65% of the total carbonyl from said monoxide and available from the nickel carbonyl, the acetylene being supplied in an excess of 1% to 10% based on total available carbonyl, the said acid being supplied within 20% of equivalency based on the nickel carbonyl, and the tert-dodecanethiol being supplied between equivalency and 10% excess based on total available carbonyl.

References Cited in the file of this patent

FOREIGN PATENTS 856,293   Germany _____ Nov. 20, 1952